(12) United States Patent
Matsubara et al.

(10) Patent No.: US 11,661,051 B2
(45) Date of Patent: May 30, 2023

(54) HYBRID VEHICLE AND CONTROL METHOD THEREOF

(71) Applicants: TOYOTA JIDOSHA KABUSHIKI KAISHA, Aichi-ken (JP); AISIN AW CO., LTD., Aichi-ken (JP)

(72) Inventors: Keigo Matsubara, Aichi-ken (JP); Nobufusa Kobayashi, Aichi-ken (JP); Tomoya Inayoshi, Aichi-ken (JP)

(73) Assignees: TOYOTA JIDOSHA KABUSHIKI KAISHA, Aichi-Ken (JP); AISIN AW CO., LTD., Aichi-Ken (JP)

( * ) Notice: Subject to any disclaimer, the term of this patent is extended or adjusted under 35 U.S.C. 154(b) by 335 days.

(21) Appl. No.: 17/033,616

(22) Filed: Sep. 25, 2020

(65) Prior Publication Data

US 2021/0129830 A1 May 6, 2021

(30) Foreign Application Priority Data

Sep. 27, 2019 (JP) .............................. JP2019-177262

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/02; B60W 10/06; B60W 10/08; B60W 2510/0241;
(Continued)

(56) References Cited

U.S. PATENT DOCUMENTS

| 2002/0170758 | A1 | 11/2002 | Shimabukuro et al. |
| 2007/0087894 | A1* | 4/2007 | Tsuneyoshi ........... B60W 10/02 477/3 |

(Continued)

FOREIGN PATENT DOCUMENTS

| JP | 2002349310 A | 12/2002 |
| JP | 2011213265 A | 10/2011 |

(Continued)

*Primary Examiner* — Richard W Ridley
*Assistant Examiner* — Aimee Tran Nguyen
(74) *Attorney, Agent, or Firm* — Hauptman Ham, LLP

(57) ABSTRACT

A hybrid vehicle of the disclosure includes an engine, a motor that outputs a torque to a driving system, a hydraulic clutch that connects the engine with the motor and disconnects the engine from the motor, and a control device that performs slip control of the hydraulic clutch in response to satisfaction of a start condition of the engine and controls the motor to output at least a cranking torque to the engine. The control device sets a target value of a rotation speed difference between the engine and the motor during execution of the slip control, and increases at least one of a hydraulic pressure to the hydraulic clutch, an output torque of the motor and an output torque of the engine when a difference between the rotation speed difference and the target value is out of an allowable range. This configuration ensures good startability of the engine.

7 Claims, 7 Drawing Sheets

(51) Int. Cl.
*B60W 10/06* (2006.01)
*B60W 10/08* (2006.01)

(52) U.S. Cl.
CPC ............ *B60W 2510/0241* (2013.01); *B60W 2510/0638* (2013.01); *B60W 2510/0657* (2013.01); *B60W 2510/081* (2013.01); *B60W 2510/083* (2013.01); *B60W 2710/025* (2013.01); *B60W 2710/0666* (2013.01); *B60W 2710/083* (2013.01)

(58) Field of Classification Search
CPC . B60W 2510/0638; B60W 2510/0657; B60W 2510/081; B60W 2510/083; B60W 2710/025; B60W 2710/0666; B60W 2710/083
See application file for complete search history.

(56) References Cited

U.S. PATENT DOCUMENTS

| | | | |
|---|---|---|---|
| 2009/0017988 A1 | 1/2009 | Reuschel | |
| 2011/0246008 A1 | 10/2011 | Yoshida et al. | |
| 2016/0046281 A1* | 2/2016 | Nedorezov | B60W 20/40 180/65.265 |
| 2016/0059846 A1* | 3/2016 | Wang | B60W 10/02 180/65.265 |

FOREIGN PATENT DOCUMENTS

| | | |
|---|---|---|
| JP | 201328304 A | 2/2013 |
| JP | 201510576 A | 1/2015 |

\* cited by examiner

HYBRID VEHICLE AND CONTROL METHOD THEREOF

CROSS-REFERENCE TO RELATED APPLICATION

This application claims priority to Japanese Patent Application No. 2019-177262 filed on Sep. 27, 2019, the contents of which is incorporated herein by reference.

TECHNICAL FIELD

The present disclosure relates to a hybrid vehicle that includes an engine, a motor configured to output a torque to a driving system, and a hydraulic clutch configured to connect the engine with the motor and to disconnect the engine from the motor, as well as to a control method of the hybrid vehicle.

BACKGROUND

A proposed hybrid vehicle includes a starting control device configured to supply a fuel to a cylinder in an expansion stroke, to crank an internal combustion engine with a combustion pressure generated by ignition of the supplied fuel, and to couple a clutch such that a motor assists the cranking (as described in, for example, JP 2015-010576A). This starting control device increases a cranking torque of the motor at the time when a predetermined time period has elapsed since a start of cranking without actually checking for a failure in complete ignition of the internal combustion engine by the cranking after a start of the cranking. Another proposed hybrid vehicle includes a control device configured to perform slip control of a clutch (engagement device with separating function) and to start an internal combustion engine with a torque transmitted from a rotating electrical machine via the clutch, in response to an engine start request in the state that the engine is stopped (as described in, for example, JP 2013-028304A).

SUMMARY

The starting control device described in JP 2015-010576A does not require a time period to check for a failure in complete ignition of the engine and is thus likely to start the engine (achieve complete ignition) in a short time period. When a starting process of the engine is performed normally, however, increasing the torque of the motor is likely to cause a shock and thereby provide the poor startability of the engine. In the hybrid vehicle described in JP 2013-028304A, on the other hand, the configuration of uniformly increasing the torque of the motor after elapse of a predetermined period since a start of cranking (slip control of the clutch) is likely to cause a delay of rotation synchronization of the engine with the motor or to cause the occurrence of a shock in the process of fully engaging the clutch or the like and thereby provide the poor startability of the engine.

In a hybrid vehicle configured to start an engine with a torque transmitted from a motor via a hydraulic clutch under slip control, a main object of the present disclosure is to ensure good startability of the engine.

The present disclosure is directed to a control device of hybrid vehicle. The hybrid vehicle includes an engine, a motor configured to output a torque to a driving system, a hydraulic clutch configured to connect the engine with the motor and to disconnect the engine from the motor; and a control device configured to perform slip control of the hydraulic clutch in response to satisfaction of a start condition of the engine and to control the motor such as to output at least a cranking torque to the engine. The control device sets a target value of a rotation speed difference between rotation speeds of the engine and of the motor during execution of the slip control, and increases at least one of a hydraulic pressure that is to be supplied to the hydraulic clutch, an output torque of the motor and an output torque of the engine when a difference between the rotation speed difference and the target value is out of an allowable range.

The present disclosure is also directed to a control method of hybrid vehicle that includes an engine, a motor configured to output a torque to a driving system, and a hydraulic clutch configured to connect the engine with the motor and to disconnect the engine from the motor. The control method of the hybrid vehicle includes performing slip control of the hydraulic clutch in response to satisfaction of a start condition of the engine, while controlling the motor such as to output at least a cranking torque to the engine, and setting a target value of a rotation speed difference between rotation speeds of the engine and of the motor during execution of the slip control, and increasing at least one of a hydraulic pressure that is to be supplied to the hydraulic clutch, an output torque of the motor and an output torque of the engine when a difference between the rotation speed difference and the target value is out of an allowable range.

DESCRIPTION OF EMBODIMENTS

The following describes embodiments of the present disclosure with reference to drawings.

Figure 1:
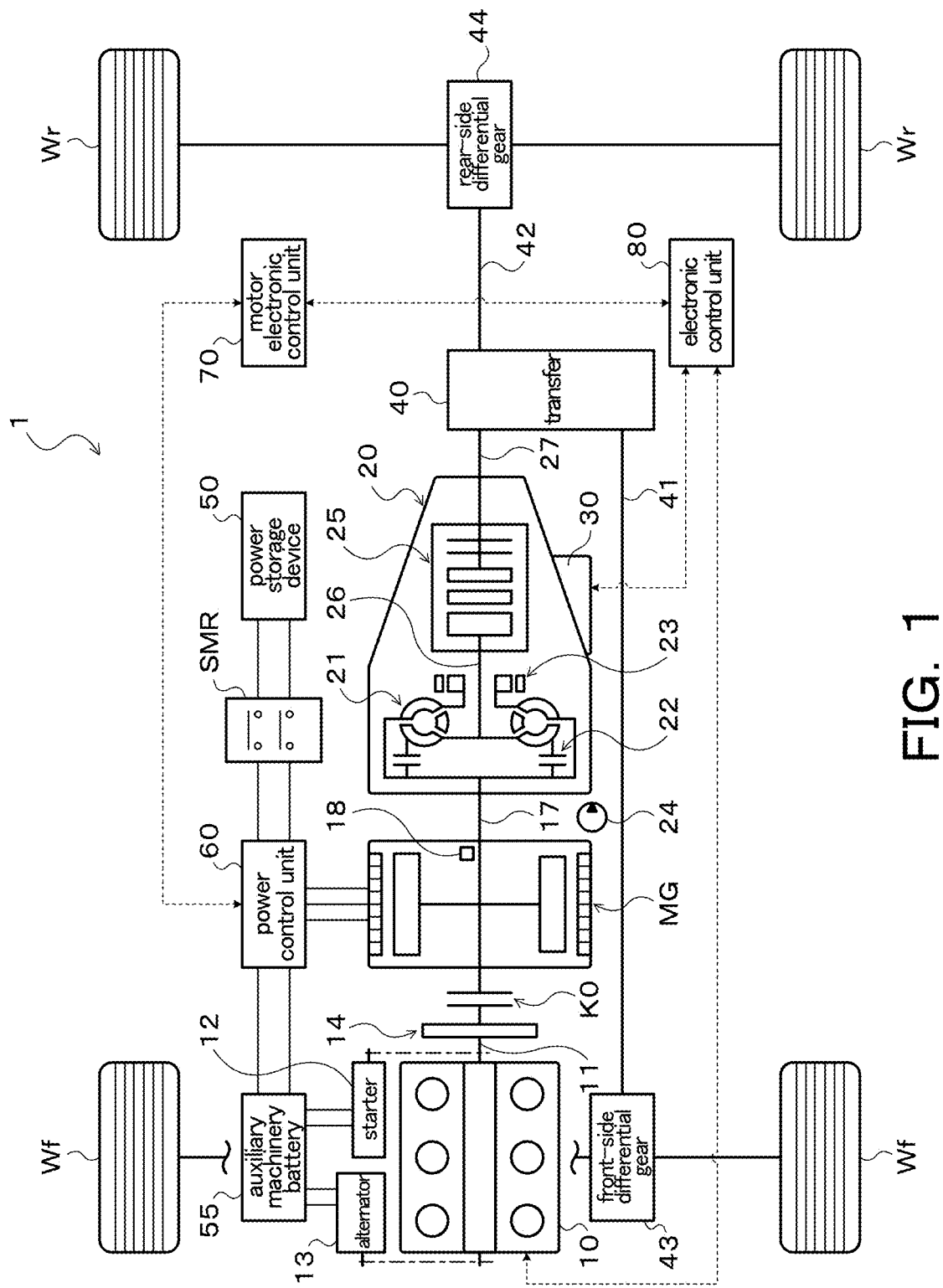
FIG. 1 is a schematic configuration diagram illustrating a hybrid vehicle according to the present disclosure.

FIG. 1 is a schematic configuration diagram illustrating a hybrid vehicle 1 according to the present disclosure. The hybrid vehicle 1 shown in FIG. 1 is a four-wheel drive vehicle including an engine (internal combustion engine) 10, a motor generator MG, a power transmission system 20, a transfer 40 and a hydraulic clutch K0. The hybrid vehicle 1 additionally includes a high voltage power storage device (hereinafter simply referred to as "power storage device") 50, an auxiliary machinery battery (low voltage battery) 55, a power control unit (hereinafter referred to as "PCU") 60 configured to drive the motor generator MG, a motor electronic control unit (hereinafter referred to as "MGECU") 70 configured to control the PCU 60, and an electronic control unit (hereinafter referred to as "main ECU") 80 configured, in combination with the MGECU 70, as the control device of the present disclosure.

The engine 10 is a multi-cylinder gasoline engine configured to cause combustion of an air-fuel mixture of gasoline (hydrocarbon fuel) and the air in a plurality of combustion chambers and to convert reciprocating motions of pistons accompanied with the combustion of the air-fuel mixture into rotating motion of a crankshaft 11. As illustrated, the engine 10 includes, for example, a starter (engine starting device) 12 used for cranking of the engine 10 mainly in a cryogenic environment and an alternator 13 driven by the engine 10 to generate electric power. Furthermore, the crankshaft 11 of the engine 10 is connected with an input member of a damper mechanism 14 (for example, a flywheel damper).

The motor generator MG is a synchronous generator motor (three-phase alternating current motor) including a rotor with permanent magnets embedded therein and a stator with three-phase coils wound thereon and is configured to transmit electric power to and from the power storage device 50 via the PCU 60. The motor generator MG operates as a motor that is driven with the power from the power storage device 50 to generate a driving torque and outputs a regenerative braking torque in the process of braking the hybrid vehicle 1. The motor generator MG also operates as a generator that generates electric power by using at least part of the power from the engine 10 under load operation. As shown in FIG. 1, the rotor of the motor generator MG is fixed to a transmission shaft 17.

The power transmission system 20 includes a torque converter (hydraulic power transmission) 21 having a torque amplifying function, a lockup clutch 22, a mechanical oil pump 23, a power-driven oil pump 24, a transmission (automatic transmission) 25, and a hydraulic control device 30 configured to regulate the pressure of hydraulic oil and the like. The torque converter 21 includes a pump impeller that is connected with the transmission shaft 17 via a front cover (input member), a turbine runner that is connected with an input shaft 26 of the transmission 25, and a stator that serves to rectify the flow of the hydraulic oil flowing from the turbine runner to the pump impeller and amplitude the torque. The lockup clutch 22 is a multiple disk hydraulic friction clutch or a single disk hydraulic friction clutch that serves to connect the front/Cover with the input shaft 26 of the transmission 25 and disconnect the front cover from the input shaft 26.

The transmission 25 is a multiple speed transmission, for example, four-speed to ten-speed transmission and includes an input shaft 26, an output shaft 27, a plurality of planetary gears, a plurality of clutches and a plurality of brakes (engagement element for change speed). The transmission 25 causes the power transmitted from the transmission shaft 17 to the input shaft 26 via either one of the torque converter 21 and the lockup clutch 22 to be subjected to speed change into multiple different speed levels and outputs the speed-changed power from the output shaft 27. The hydraulic control device 30 includes a valve body having a plurality of oil passages formed therein, a plurality of regulator valves and a plurality of linear solenoid valves. The hydraulic control device 30 is configured to regulate the hydraulic pressure of the oil from at least one of the mechanical oil pump 23 and the power-drive oil pump 24 and supply the oil of the regulated hydraulic pressure to, for example, the torque converter 21, the lockup clutch 22 and the clutches and the brakes of the transmission 25.

The transfer 40 includes a center differential and a differential locking mechanism configured to lock the center differential (neither shown) and is configured to transmit the torque from the output shaft 27 of the transmission 25 in a distributive manner into a front-side propeller shaft 41 (first shaft) and a rear-side propeller shaft 42 (second shaft). The power that is output to the front-side propeller shaft 41 by the transfer 40 is transmitted via a front-side differential gear 43 to left and right front wheels Wf. The power that is output to the rear-side propeller shaft 42 by the transfer 40 is transmitted via a rear-side differential gear 44 to left and right rear wheels Wr.

The clutch K0 is configured to connect an output member of the damper mechanism 14, i.e., the crankshaft 11 of the engine 10, with the transmission shaft 17, i.e., the rotor of the motor generator MG and to disconnect the output member from the transmission shaft 17. According to the embodiment, the clutch K0 is a multiple disk hydraulic friction clutch (frictional engagement element) including a clutch hub that is normally connected with the output member of the damper mechanism 14, a clutch drum that is normally connected with the transmission shaft 17, a piston, a plurality of friction plates, a plurality of center plates, an engagement oil chamber which the hydraulic oil is supplied to, and an centrifugal hydraulic cancellation chamber which the hydraulic oil is supplied to. More specifically, an engagement oil pressure that is regulated by the hydraulic control device 30 described above is supplied to the engagement oil chamber of the clutch K0. A circulatory pressure that is regulated by the hydraulic control device 30 described above is supplied to the centrifugal hydraulic cancellation chamber of the clutch K0.

According to the embodiment, the clutch K0 is a normally-opened clutch that is released with a decrease in the engagement oil pressure and that is engaged with an increase in the engagement oil pressure. When the clutch K0 is engaged, the engine 10 (the crankshaft 11) is connected with the motor generator MG via the clutch K0. This causes the engine 10 to be connected with the front wheels Wf and the rear wheels Wr via the damper mechanism 14, the clutch K0, the transmission shaft 17 (the motor generator MG), the power transmission device 20, the transfer 40 and the like. The clutch K0 may be placed inside of the rotor of the motor generator MG or may be placed in an axial direction between the damper mechanism 14 and the motor generator MG.

The power storage device 50 is a lithium ion rechargeable battery or a nickel metal hydride battery having a rated output voltage of, for example, about 200 V to 300 V. The power storage device 50 may be a capacitor or may include both a secondary battery and a capacitor. The power storage device 50 is under management of a power supply management electronic control device (not shown, hereinafter referred to as "power supply management ECU") including a non-illustrated microcomputer. The power supply management ECU derives, for example, a state of charge SOC (charging rate), a target charge-discharge power Pb*, an allowable charging power Win and an allowable discharging power Wout of the power storage device 50, based on an inter-terminal voltage from a voltage sensor, a charge-discharge current from a current sensor, a battery temperature from a temperature sensor of the power storage device 50 and the like. The auxiliary machinery battery 55 is a lead acid battery having a rated output voltage of, for example, 12 V and is charged with electric power from the alternator 13 described above. The auxiliary machinery battery 55 is configured to supply electric power to auxiliary machines, such as the starter 12 of the engine 10, the power-driven oil pump 24 and the hydraulic control device 30 and a variety of ECUs.

The PCU 60 is connected with the power storage device 50 via a system main relay SMR and is also connected with the auxiliary machinery battery 55. The PCU 60 includes an inverter configured to drive the motor generator MG, a boost converter, a DC-DC converter and the like (none of them shown). The inverter includes, for example, six transistors that serve as switching elements and six diodes that are connected in a reverse direction in parallel with these transistors. The boost converter is configured to step up the voltage from the power storage device 50 and supply the stepped-up voltage to the inverter and to step down the voltage from the inverter and supply the stepped-down voltage to the power storage device 50. The DC-DC converter is configured to step down the voltage of the power from a high voltage system including the power storage device 50 and supply the power of the stepped-down voltage to a low voltage system, i.e., the auxiliary machinery battery 55, the variety of auxiliary machines, and the like.

The MGECU 70 has a microcomputer including, for example, a CPU, a ROM, a RAM and input/output interfaces (none of them are shown), various driving circuits, various logic ICs, and the like. The MGECU 70 is configured to obtain command values from the main ECU 80, a non-boosted voltage and a boosted voltage from the boost converter, a rotational position of the rotor of the motor generator MG, i.e., a rotational position of the transmission shaft 17, detected by a rotational position sensor (resolver) 18, phase currents applied to the motor generator MG, and the like. The MGECU 70 performs switching control of the inverter and the boost converter, based on these pieces of information. The MGECU 70 calculates a rotation speed Nm (rpm) of the motor generator MG (the rotor), based on the detection value of the rotational position sensor 18 and also calculates an angular velocity Wm and an angular acceleration am of the rotor (the transmission shaft 17), at every predetermined time interval (for example, every several msec).

The main ECU 80 has a microcomputer including, for example, a CPU, a ROM, a RAM and input/output interfaces (none of them are shown), various driving circuits, various logic ICs, and the like. The main ECU 80 is configured to obtain a signal from a start switch, an accelerator position Acc (a depression amount of an accelerator pedal) detected by a non-illustrated accelerator pedal position sensor, a vehicle speed V detected by a non-illustrated vehicle speed sensor, a change gear ratio 7 of the transmission 25 corresponding to the accelerator position Acc and the vehicle speed V, detection values of various sensors of the engine 10, such as a water temperature sensor and a crank angle sensor, the rotation speed Nm and the angular acceleration am of the motor generator MG from the MGECU 70, the SOC, the target charge-discharge power Pb*, the allowable charging power Win and the allowable discharging power Wout of the power storage device 50 from the power supply management ECU, and the like. The main ECU 80 controls the engine 10, the power transmission device 20 and the clutch K0 and sets a torque command Tm* for the motor generator MG, based on these pieces of information.

Figure 2:
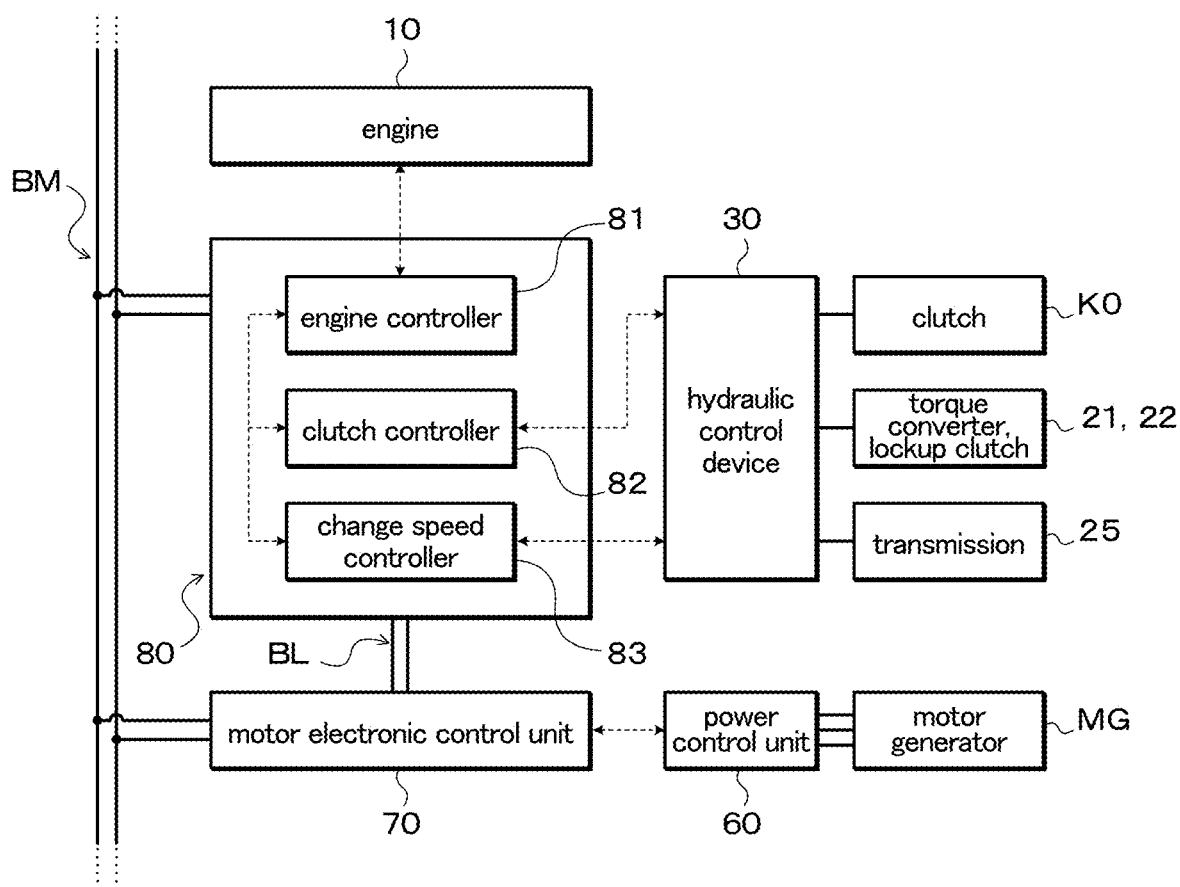
FIG. 2 is a block configuration diagram illustrating a control device of the hybrid vehicle according to the present disclosure.

According to the embodiment, as shown in FIG. 2, an engine controller 81, a clutch controller 82 and a change speed controller 83 that transmit information to and from each other are established as functional blocks (modules) in the main ECU 80 by the cooperation of a hardware configuration such as a CPU, a ROM, a RAM and logic ICs and a software configuration such as various programs installed in the ROM. The engine controller 81 performs drive control of the hybrid vehicle 1 and intake air flow control (throttle position control), fuel injection control, ignition control and the like of the engine 10. The engine controller 81 calculates a rotation speed Ne of the engine 10 (the crankshaft 11), based on the signal from the crank angle sensor and also calculates an estimated output torque $Te_{est}$ of the engine 10, based on the rotation speed Ne, an intake air flow, an amount of fuel injection, an ignition timing and the like. Furthermore, the engine controller 81 controls the auxiliary machines of the engine 10, such as the starter 12. The clutch controller 82 controls the hydraulic control device 30 such as to make the clutch K0 released, slip-engaged (half-engaged) or fully engaged according to the state of the hybrid vehicle 1. The change speed controller 83 controls the hydraulic control device 30, such that the lockup clutch 22 and the clutches and the brakes of the transmission 25 are operated according to the condition of the hybrid vehicle 1.

As shown in FIG. 2, the main ECU 80, the MGECU 70, the power supply management ECU and the like are respectively connected with a common communication line (multiple communication bus) BM that is a CAN bus including two communication lines (wire harnesses) Lo and Hi to transmit information (communication frames) to and from each other by CAN communication via the common communication line BM. Furthermore, the MGECU 70 is individually connected with the main ECU 80 via an exclusive communication line (local communication bus) BL that is a CAN bus including two communication lines Lo and Hi to transmit information (communication frames) to and from the main ECU 80 by CAN communication via the exclusive communication line BL.

In the hybrid vehicle 1 having the configuration described above, during a system stop (during parking) when no hydraulic pressure is generated by the mechanical oil pump 23 and the power-driven oil pump 24, releasing the clutch K0 disconnects the engine 10 from the transmission shaft 17, i.e., from the motor generator MG. After a system start, the hybrid vehicle 1 is started basically with a torque (power) that is output from the motor generator MG via the transmission shaft 17 to the power transmission device 20 as the driving system in the state that the clutch K0 is released.

In the process of driving the hybrid vehicle 1, the engine controller 81 of the main ECU 80 derives a required torque Tr* (including a required braking torque) that is to be output to the output shaft 27 of the transmission 25 corresponding to the accelerator position Acc and the vehicle speed V, and sets a required driving power Pd* that is required for driving the hybrid vehicle 1, based on the required torque Tr* and the rotation speed of the output shaft 27. In the case where operation of the engine 10 is stopped, the engine controller 81 sets a target power Pe*, a target rotation speed Ne* and a target torque Te* of the engine 10 to zero, and sets a torque command value Tm* in a range of the allowable charging power Win and the allowable discharging power Wout, such that a torque corresponding to the required torque Tr* is output from the motor generator MG to the output shaft 27. The torque command value Tm* is sent from the engine controller 81 to the MGECU 70. The MGECU 70 performs switching control of the inverter and the boost converter of the PCU 60, based on the torque command value Tm*.

After a system start of the hybrid vehicle 1, the engine controller 81 of the main ECU 80 determines whether an engine start condition is satisfied. The engine start condition is determined in advance in relation to the required torque Tr*, the required driving power Pd*, the target charge-discharge power Pb* and the allowable discharging power Wout of the power storage device 50, and the like. When determining satisfaction of the engine start condition, the engine controller 81 sends a clutch engagement command to the clutch controller 82. When receiving the clutch engagement command, the clutch controller 82 starts slip control of the clutch K0 or more specifically a series of control of the hydraulic control device 30 such as to provide slip engagement of the clutch K0.

After the start of the slip control of the clutch K0 by the clutch controller 82, the engine controller 81 (or the clutch controller 82) calculates a torque that balances a reaction torque from the engine 10-side that is cranked to rotate, as a cranking torque. Furthermore, the engine controller 81 sets the torque command Tm* to a sum of the cranking torque and a required driving torque that is determined from the required torque Tr* and the change gear ratio (gear ratio) of the transmission 25, and sends the torque command Tm* to the MGECU 70. When receiving the torque command Tm* from the engine controller 81, the MGECU 70 controls the PCU 60 (or more specifically, the inverters) such that at least a cranking torque to the engine 10 is output from the motor generator MG. This accordingly causes the engine 10 to be cranked with the torque transmitted from the motor generator MG via the clutch K0 that is under slip control. The cranking torque and the required driving torque described above may be separately sent from the engine controller 81 to the MGECU 70 and may be summed up on the MGECU 70-side.

Moreover, in response to satisfaction of a predetermined condition, the clutch controller 82 starts pressure increase control that increases the engagement oil pressure supplied from the hydraulic control device 30 to the clutch K0 with elapse of time, such as to fully engage the clutch K0. The engine controller 81 opens the throttle valve in response to satisfaction of the engine start condition, and starts fuel injection control and ignition control (ignition) of the engine 10 when an ignition start timing, which is determined in advance according to the state (driving state) of the hybrid vehicle 1, comes. According to the embodiment, when the rotation speed Nm of the motor generator MG (the transmission shaft 17) is equal to or higher than a predetermined rotation speed (for example, an idling rotation speed (about 1000 rpm)) (i.e., when a predetermined condition is satisfied), the fuel injection control and the ignition control are started prior to a start of the pressure increase control according to, for example, the rotation speed Nm. When the rotation speed Nm is lower than the predetermined rotation speed, on the other hand, the fuel injection control and the ignition control are started after the clutch K0 is fully engaged.

According to the embodiment, when the fuel injection control and the ignition control (ignition) of the engine 10 are started during slip control of the clutch K0 (prior to a start of the pressure increase control), the engine controller 81 sets the target rotation speed Ne* of the engine 10 to the rotation speed Nm of the motor generator MG and also sets the target torque Te* of the engine 10 to a relatively small positive value Tz that is determined in advance by experiments and analyses. The engine controller subsequently performs intake air flow control, fuel injection control, ignition control and the like, such that the rotation speed Ne of the engine 10 becomes equal to the target rotation speed Ne* and that the output torque of the engine 10 becomes equal to the target torque Te*. Furthermore, after a start of the pressure increase control of the clutch K0, the engine controller 81 sets the target torque Te* of the engine 10, such that the rotation speed Ne of the engine 10 is approximately equal to the rotation speed Nm of the motor generator MG until completion of the pressure increase control.

When the clutch K0 is fully engaged and the start of the engine 10 is completed by the series of processing described above, the engine controller 81 sets the target power Pe*, the target rotation speed Ne* and the target torque Te* of the engine 10, such that the engine 10 is efficiently operated, based on the required driving power Pd*, the target charge-discharge power Pb* of the power storage device 50 and the like. Furthermore, the engine controller 81 sets the torque command Tm* of the motor generator MG according to the required torque Tr* and the like within the range of the allowable charging power Win and the allowable discharging power Wout. This configuration causes the engine 10 to be operated at an operating point near to an optimum fuel consumption line and also enables the power storage device 50 to be charged with electric power generated by the motor generator MG or enables the motor generator MG to be driven with electric power from the power storage device 50 according to the SOC of the power storage device 50, such that the torque is output from both the engine 10 and the motor generator MG to the front wheels Wf and the rear wheels Wr. The hybrid vehicle 1 can thus assures the good power performance, while improving the fuel consumption of the engine 10.

Figure 3:
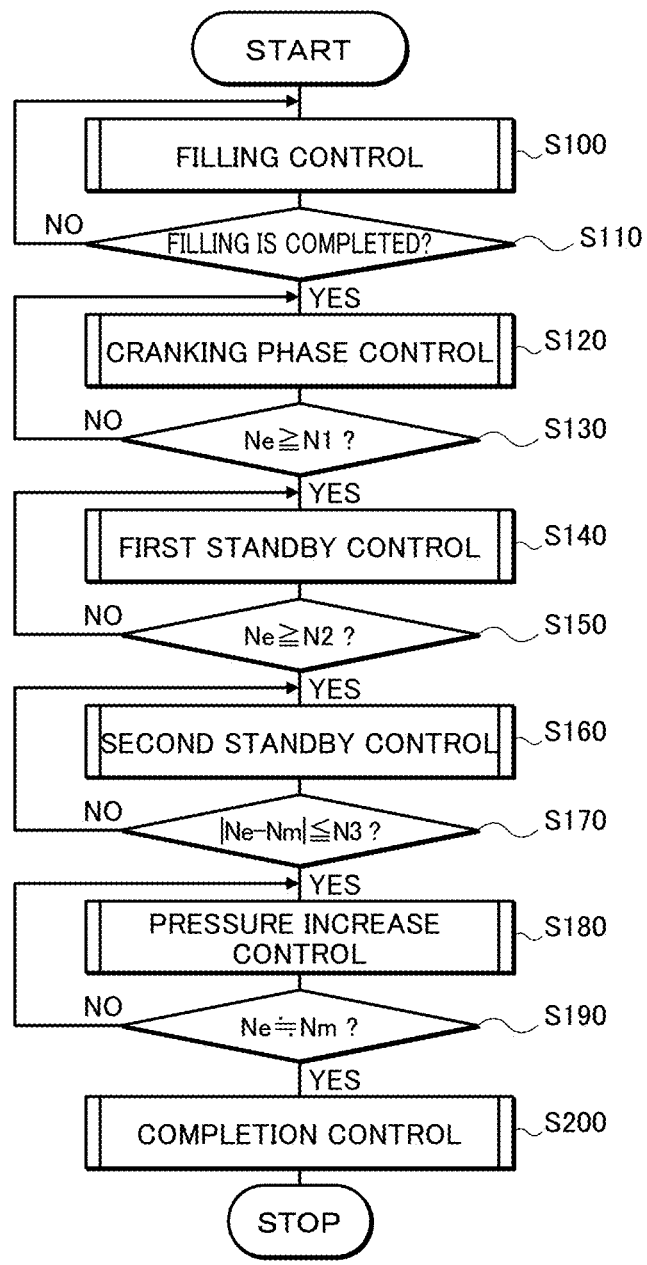
FIG. 3 is a flowchart illustrating a clutch control routine that is performed in the hybrid vehicle according to the present disclosure.
Figure 4:
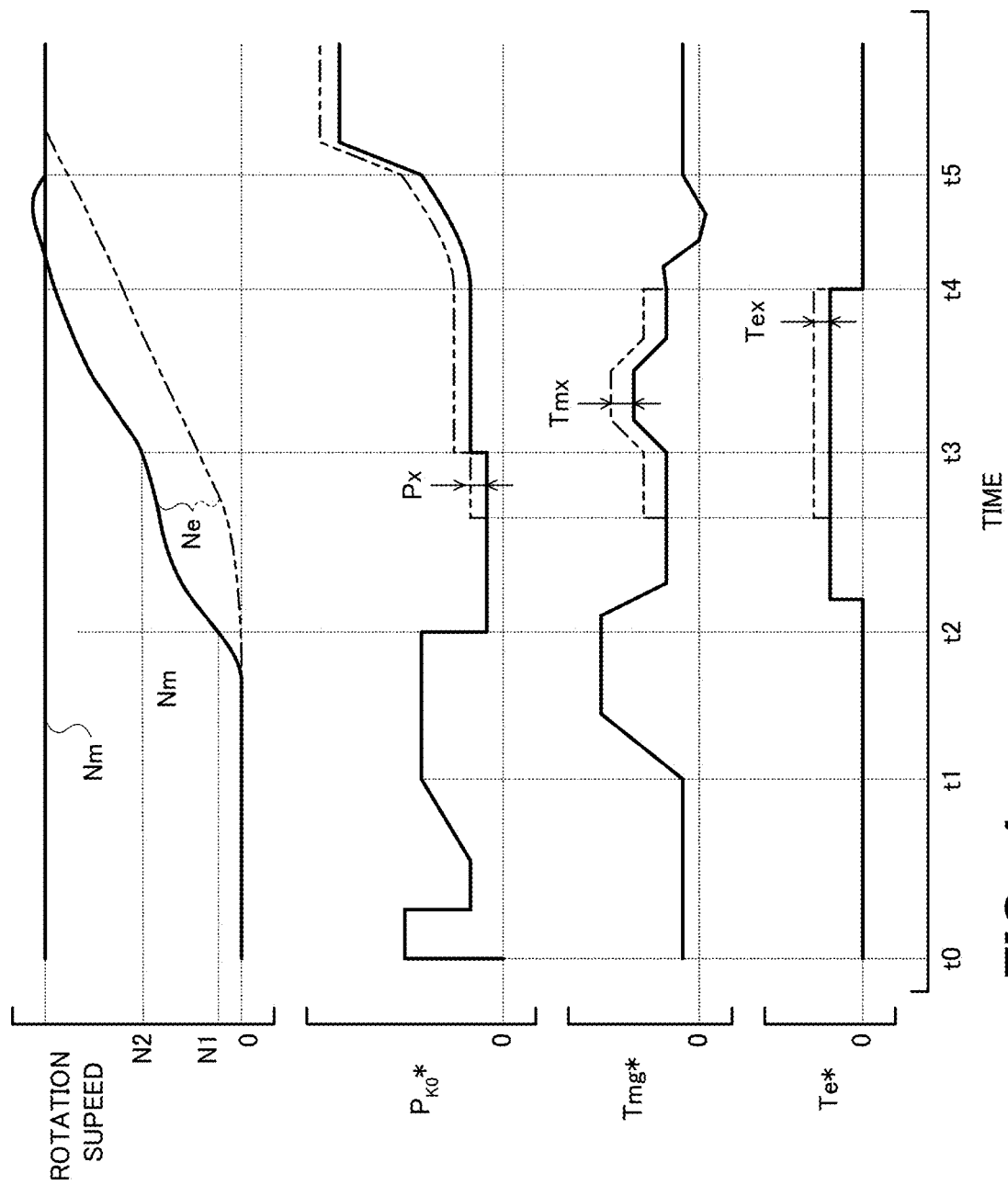
FIG. 4 is a time chart showing one example of time changes in rotation speeds of a motor and an engine, an engagement oil pressure command value of a hydraulic clutch, a torque command value of the motor and a target torque of the engine when the routine of FIG. 3 is performed.

The following describes the slip control of the clutch K0 in the process of starting the engine 10. FIG. 3 is a flowchart illustrating a clutch control routine that is performed by the clutch controller 82 of the main ECU 80 in response to satisfaction of a start condition of the engine 10. FIG. 4 is a time chart illustrating time changes in an engagement oil pressure command value $P_{K0}*$ of the clutch K0, the rotation speed Nm of the motor generator MG and the rotation speed Ne of the engine 10 when the clutch control routine is performed.

As shown in FIG. 3, upon satisfaction of the start condition of the engine 10 (at a time t0 shown in FIG. 4), the clutch controller 82 starts filling control (first fill control) in response to a clutch engagement command from the engine controller 81 (step S100). The filling control sets the engagement oil pressure command value $P_{K0}*$ such as to rapidly fill the engagement oil chamber of the clutch K0 with the hydraulic oil and controls the linear solenoid valve that regulates the engagement oil pressure of the hydraulic control device 30 or more specifically of the clutch K0, based on the engagement oil pressure command value $P_{K0}*$, such that the clutch K0 falls into a state immediately before a start of slip engagement. The stage when such filling control is performed is called "filling phase".

The clutch controller 82 subsequently determines whether a determination time has elapsed since the start of the filling control (step S110). The filling control of step S100 is continuously performed until elapse of the determination time. The determination time used as a reference value at step S110 is set, for example, based on the temperature of the hydraulic oil, the cooling water temperature of the engine 10, the rotation speed Nm of the motor generator MG and the vehicle speed V. When it is determined that the determination time has elapsed and the filling has been completed (step S110: YES) (at a time t1 shown in FIG. 4), the clutch controller 82 starts cranking phase control (step S120). The cranking phase control keeps the engagement oil pressure command value $P_{K0}*$ at a value required for cranking the engine 10 in the slip-engaged state of the clutch K0. The stage when such cranking phase control is performed is called "cranking phase". Such control causes the engine 10 to be cranked with the torque that is transmitted from the motor generator MG via the clutch K0 in the slip-engaged state and causes the crankshaft 11 to start rotating.

After the start of the cranking phase control, the clutch controller 82 subsequently determines whether the rotation speed Ne of the engine 10 obtained from the engine controller 81 becomes equal to or higher than a first reference value N1 (for example, about 200 rpm) (step S130). The clutch controller 82 continuously performs the cranking phase control of step S120 while the rotation speed Ne is lower than the first reference value N1. When it is determined that the rotation speed Ne becomes equal to or higher than the first reference value N1 (step S130: YES) (at a time t2 shown in FIG. 4), the clutch controller 82 starts first standby control (step S140).

The first standby control decreases the engagement oil pressure command value $P_{K0}^*$ at a predetermined relatively large slope to zero or to a first standby pressure (fixed value) that is a predetermined relatively low pressure value and keeps the engagement oil pressure command value $P_{K0}^*$ at the first standby pressure. Such control decreases the inertia (moment of inertia) of the crankshaft 11 that starts rotating accompanied with the slip engagement of the clutch K0 and accelerates an increase in rotation of the engine 10. The stage when such first standby control is performed is called "first standby phase". After the start of the first standby control, the clutch controller 82 determines whether the rotation speed Ne of the engine 10 obtained from the engine controller 81 becomes equal to or higher than a second reference value N2 (for example, 400 to 500 rpm) that is determined to be higher than the first reference value N1 described above (step S150). The clutch controller 82 continuously performs the first standby control of step S140 while the rotation speed Ne is lower than the second reference value N2. When it is determined that the rotation speed Ne becomes equal to or higher than the second reference value N2 (step S150: YES) (at a time t3 shown in FIG. 4), the clutch controller 82 starts second standby control (step S160).

The second standby control keeps the engagement oil pressure command value $P_{K0}^*$ at a second standby pressure (fixed value) that is slightly higher than the first standby pressure described above. The stage when such second standby control is performed is called "second standby phase". After the start of the second standby control, the clutch controller 82 determines whether an absolute value of a rotation speed difference ΔN (=Ne−Nm) between the rotation speed Ne of the engine 10 obtained from the engine controller and the rotation speed Nm of the motor generator MG obtained from the MGECU 70 is equal to or less than a predetermined relatively small value N3 (positive value, for example, about 400 rpm) (step S170). The clutch controller 82 continuously performs the second standby control of step S160 while the absolute value of the rotation speed difference ΔN is greater than the value N3. When it is determined that the absolute value of the rotation speed difference ΔN becomes equal to or less than the value N3 (step S170: YES) (at a time t4 shown in FIG. 4), the clutch controller 82 starts pressure increase control (step S180).

The pressure increase control increases the engagement oil pressure command value $P_{K0}^*$ at a predetermined slope with elapse of time. The stage when such pressure increase control is performed is called "pressure increase phase". After the start of the pressure increase control, the clutch controller 82 determines whether the difference between the rotation speed Ne of the engine 10 obtained from the engine controller 81 and the rotation speed Nm of the motor generator MG obtained from the MGECU 70 enters a predetermined range (step S190). The clutch controller 82 continuously performs the pressure increase control of step S180, while the difference between the rotation speed Ne and the rotation speed Nm of the motor generator MG does not enter the predetermined range. When it is determined that the difference between the rotation speed Ne and the rotation speed Nm enters the predetermined range (step S190: YES) (at a time t5 shown in FIG. 4), the clutch controller 82 assumes that the clutch K0 is fully engaged and starts completion control (step S200). The completion control of step S200 increases the engagement oil pressure command value $P_{K0}^*$ to a maximum pressure (for example, a line pressure) at a relatively rapid rate within a predetermined time and subsequently keeps the engagement oil pressure command value $P_{K0}^*$ at the maximum pressure. The stage when such completion control is performed is called "completion phase". Such control causes the maximum pressure to be supplied to the engagement oil chamber of the clutch K0 and maintains the clutch K0 in the completely engaged state. The clutch controller 82 then terminates the routine of FIG. 3.

Figure 5:
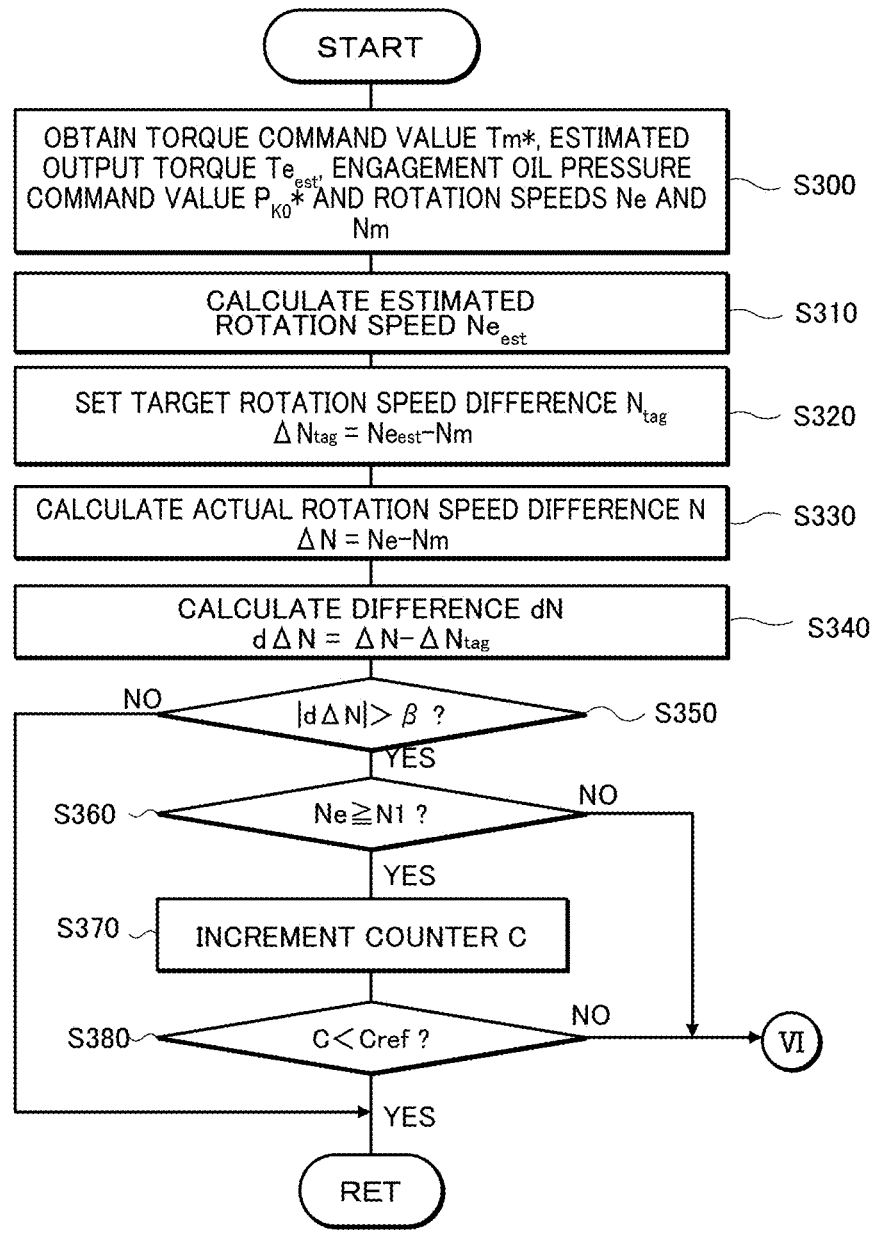
FIG. 5 is a flowchart illustrating a backup requirement/non-requirement determination routine that is performed in the hybrid vehicle according to the present disclosure.

FIG. 5 is a flowchart illustrating a backup requirement/ non-requirement determination routine that is performed by, for example, the engine controller 81 of the main ECU 80, while the clutch controller 82 performs slip control of the clutch K0 including multiple phases. According to the embodiment, the routine of FIG. 5 is performed by the engine controller 81 repeatedly at every predetermined time interval, for example, during a time period from a start of the cranking phase control to a start of the completion control by the clutch controller 82.

When the routine of FIG. 5 is started, the engine controller 81 obtains information required for control, i.e., the engagement oil pressure command value $P_{K}O^*$ from the clutch controller 82, the rotation speed Nm of the motor generator MG from the MGECU 70, the torque command value Tm*, the rotation speed Ne of the engine 10 and the estimated output torque $Te_{est}$ (step S300). The engine controller 81 subsequently calculates an estimated rotation speed $Ne_{est}$ of the engine 10 (step S310). According to the embodiment, at step S310, the engine controller 81 calculates the estimated rotation speed $Ne_{est}$ by solving a predetermined equation of motion based on the engagement oil pressure command value $P_{K0}^*$, the torque command value Tm* and the estimated output torque $Te_{est}$ obtained at step S300. According to a modification, at step S310, the estimated rotation speed $Ne_{est}$ corresponding to the engagement oil pressure command value $P_{K0}^*$, the torque command value Tm* and the estimated output torque $Te_{est}$ may be derived from a map that is created in advance. According to another modification, at step S310, the estimated rotation speed $Ne_{est}$ may be calculated by further taking into account the temperature of the hydraulic oil, the cooling water temperature of the engine 10, the temperature of the intake air, the atmospheric pressure and the like.

After calculating the estimated rotation speed $Ne_{est}$ of the engine 10, the engine controller 81 sets a target rotation speed difference (target value) $\Delta N_{tag}$ to a difference (=$Ne_{est}$−Nm) between the estimated rotation speed $Ne_{est}$ and the rotation speed Nm of the motor generator MG obtained at step S300 (step S320). This target rotation speed difference $\Delta N_{tag}$ is a rotation speed difference (ideal value) between the rotation speeds of the engine 10 and of the motor generator MG when the clutch K0, the motor generator MG and the engine 10 are normally operated according to respective command values. The engine controller 81 also calculates a rotation speed difference $\Delta N$ (=Ne−Nm) between the rotation speed Ne calculated on the basis of the signal from the crank angle sensor and the rotation speed Nm of the motor generator MG obtained at step S300 (step S330). The engine controller 81 subsequently calculates a difference $d\Delta N$ (=$\Delta N$−$\Delta N_{tag}$) between the rotation speed difference $\Delta N$ and the target rotation speed difference $\Delta N_{tag}$ (step S340).

The engine controller 81 subsequently determines whether the absolute value of the difference $d\Delta N$ calculated at step S340 is larger than a predetermined relatively small reference value $\beta$ (positive value) (step S350). The reference value $\beta$ at step S350 may be a fixed value or may be different values determined for the respective phases of the slip control. When it is determined that the absolute value of the difference $d\Delta N$ is equal to or smaller than the reference value $\beta$ (step S350: NO), the engine controller 81 once terminates the routine of FIG. 5 without any further processing. When the difference $d\Delta N$ is included in an allowable range including zero (−$\beta$≤$d\Delta N$≤$\beta$), it is regarded that the rotation speed difference $\Delta N$ is approximately equal to the target rotation speed difference $\Delta N_{tag}$ and that the actual rotation speed of the engine 10 is appropriately increased by the slip control of the clutch K0. After once terminating the routine of FIG. 5, the engine controller 81 performs the routine of FIG. 5 again when a next execution timing comes.

When it is determined that the absolute value of the difference $d\Delta N$ is larger than the reference value $\beta$ (step S350: YES), on the other hand, the engine controller 81 determines whether the rotation speed Ne obtained at step, S300 is equal to or higher than the first reference value N1 (predetermined rotation speed) described above (step S360). When it is determined that the rotation speed Ne is lower than the first reference value N1 (step S360: NO), the engine controller 81 performs a backup control routine shown in FIG. 6 and FIG. 7. More specifically, when the difference $d\Delta N$ is out of the allowable range, the rotation speed Ne is lower than the first reference value N1, and the phase of the slip control is expected to be the cranking phase, the backup control routine of FIGS. 6 and 7 is started immediately.

When it is determined that the rotation speed Ne is equal to or higher than the first reference value N1 (step S360: YES), on the other hand, the engine controller 81 increments a counter C (step S370) and determines whether the counter C is less than a predetermined reference value Cref (=an integral number of not less than 2) (step S380). When it is determined that the counter C is less than the reference value Cref (step S380: YES), the engine controller once terminates the routine of FIG. 5. The engine controller 81 performs the routine of FIG. 5 again when a next execution timing comes.

When it is determined that the counter C is equal to or larger than the predetermined reference value Cref (step S380: NO), on the other hand, the engine controller 81 starts the backup control routine shown in FIG. 6 and FIG. 7. More specifically, when the rotation speed Ne is equal to or higher than the first reference value N1 and the phase of the slip control is expected to be the first standby phase or the later phase, the backup control routine of FIGS. 6 and 7 is started in the state where a time period determined from the reference value Cref and the execution period of the routine of FIG. 5 (predetermined time period) has elapsed with the difference $d\Delta N$ kept out of the allowable range described above. According to a modification, the backup requirement/non-requirement determination routine of FIG. 5 may be performed by the clutch controller 82.

Figure 6:
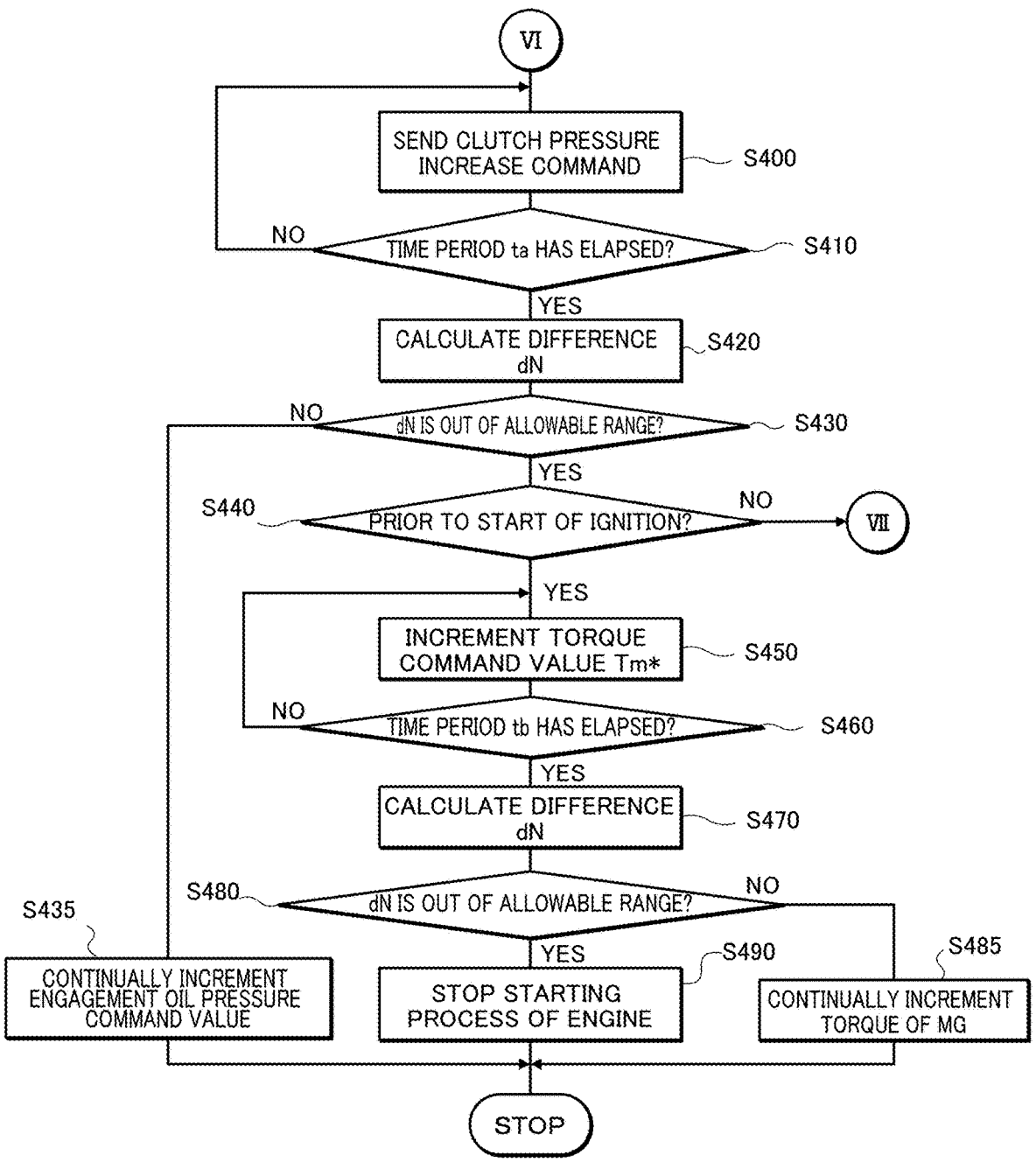
FIG. 6 is a flowchart showing a backup control routine that is performed in the hybrid vehicle according to the present disclosure.
Figure 7:
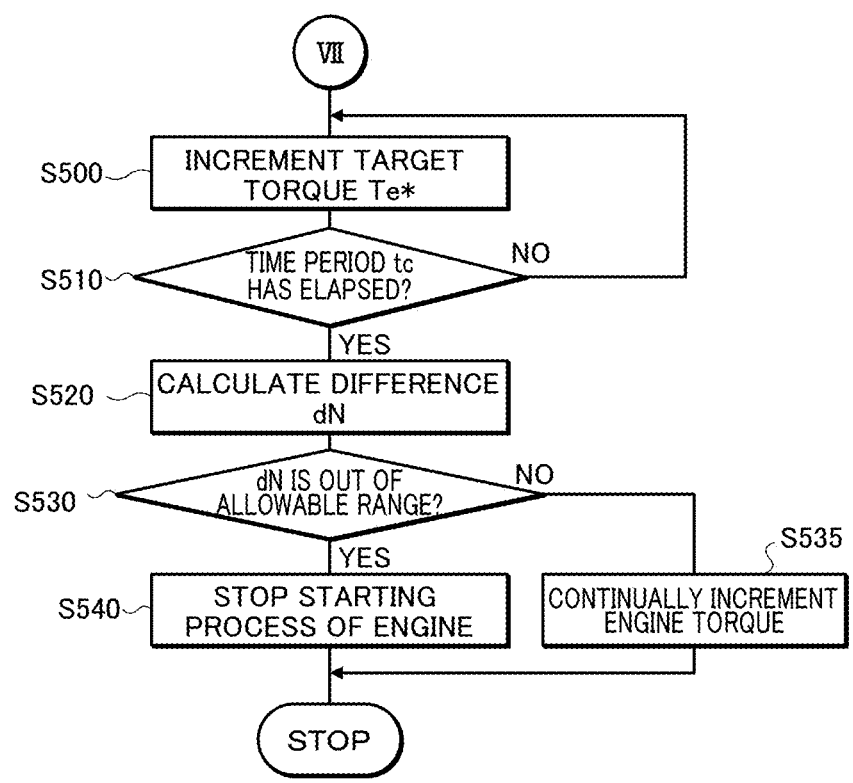
FIG. 7 is a flowchart showing the backup control routine that is performed in the hybrid vehicle according to the present disclosure.

When the backup control routine of FIGS. 6 and 7 is started, the engine controller 81 first sends a clutch pressure increase command to the clutch controller 82, in order to increase an engagement oil pressure that is to be supplied from the hydraulic control device 30 to the clutch K0 (step S400). The engine controller 81 subsequently determines whether a predetermined time period ta has elapsed since a start of the processing of step S400 (step S410) and repeats the processing of step S400 until elapse of the time period ta. The clutch controller 82 increments the engagement oil pressure command value $P_{K0}*$ by a predetermined value Px (shown in FIG. 4) every time the engagement oil pressure command value $P_{K0}*$ is to be set, while the clutch pressure increase command is sent from the engine controller 81. The time period ta used as a reference value at step S410 is determined in advance by experiments and analyses as a time period from a time when the clutch controller 82 starts incrementing the engagement oil pressure command value $P_{K0}*$ by the value Px to a time when the engagement oil pressure actually supplied from the hydraulic control device 30 to the clutch K0 is increased by the value Px.

When it is determined that the time period to has elapsed (step S410: YES), the engine controller 81 calculates the difference $d\Delta N$ (=$\Delta N$−$\Delta N_{tag}$) between the rotation speed difference $\Delta N$ of the rotation speeds of the engine 10 and of the motor generator MG and the target rotation speed difference $\Delta N_{tag}$ (step S420) in the same manner as the processing of steps S300 to S340 in the routine of FIG. 5. The engine controller 81 subsequently determines whether the difference $d\Delta N$ calculated at step S420 is out of an allowable range (step S430). A reference value that is compared with the difference $d\Delta N$ (absolute value) at step S430 may be a fixed value or may be different values determined for the respective phases of the slip control, like step S350 described above.

When it is determined at step S430 that the difference $d\Delta N$ is within the allowable range, it is regarded that the torque transmitted from the clutch K0 to the crankshaft 11 of the engine 10 (clutch torque) is increased with an increase in the engagement oil pressure command value $P_{K0}*$, i.e., with an increase in the engagement oil pressure that is to be supplied to the clutch K0 and that such an increase increases the actual rotation speed of the engine 10 such that the rotation speed difference $\Delta N$ becomes approximately equal to the target rotation speed difference $\Delta N_{tag}$. Accordingly, when it is determined that the difference $d\Delta N$ is within the allowable range (step S430: NO), the engine controller 81 sends a command signal to the clutch controller to continually increment the engagement oil pressure command value $P_{K0}*$ by the value Px (step S435) and then terminates the routine of FIG. 6.

When it is determined that the difference $d\Delta N$ is out of the allowable range (step S430: YES), on the other hand, the engine controller 81 subsequently determines whether fuel injection control and ignition control (ignition) of the engine 10 have been started (step S440). When it is determined that the fuel injection control and the ignition control (ignition) of the engine 10 have not yet been started (step S440: YES), the engine controller 81 increments the torque command value Tm* of the motor generator MG by a predetermined value Tmx (shown in FIG. 4) (step S450). The engine controller 81 subsequently determines whether a predetermined time period tb has elapsed since a start of the processing of step S450 (step S460) and repeats the process of incrementing the torque command value Tm* by the predetermined value Tmx every time the torque command value Tm* is to be set, until elapse of the time period tb. The time period tb used as a reference value at step S460 is determined in advance by experiments and analyses.

When it is determined that the time period tb has elapsed (step S460: YES), the engine controller 81 calculates the difference $d\Delta N$ ($=\Delta N-\Delta N_{tag}$) between the rotation speed difference $\Delta N$ of the rotation speeds of the engine 10 and of the motor generator MG and the target rotation speed difference $\Delta N_{tag}$ (step S470) in the same manner as the processing of steps S300 to S340 in the routine of FIG. 5. The engine controller 81 subsequently determines whether the difference $d\Delta N$ calculated at step S470 is out of an allowable range (step S480). A reference value that is compared with the difference $d\Delta N$ (absolute value) at step S480 may be a fixed value or may be different values determined for the respective phases of the slip control, like step S350 described above.

When it is determined at step S480 that the difference $d\Delta N$ is within the allowable range, it is regarded that the output torque of the motor generator MG, i.e., the torque that is to be transmitted from the motor generator MG to the clutch K0, is increased with an increase in the torque command value Tm* and that such an increase increases the actual rotation speed of the engine 10 such that the rotation speed difference $\Delta N$ becomes approximately equal to the target rotation speed difference $\Delta N_{tag}$. Accordingly, when it is determined that the difference $d\Delta N$ is within the allowable range (step S480: NO), the engine controller 81 sets a flag indicating that the torque command value Tm* is to be continually incremented by the value Tmx (step S485) and then terminates the routine of FIG. 6. When it is determined at step S480 that the difference $d\Delta N$ is out of the allowable range, on the other hand, it is regarded that the rotation speed difference $\Delta N$ fails to follow the target rotation speed difference $\Delta N_{tag}$ even when both the engagement oil pressure command value $P_{K0}$* (the clutch torque of the clutch K0) and the torque command value Tm* (the output torque of the motor generator MG) are increased. Accordingly, when it is determined that the difference $d\Delta N$ is out of the allowable range (step S480: YES), the engine controller 81 stops the starting process of the engine 10 including the slip control of the clutch K0 and the like (step S490) and then terminates the routine of FIG. 6.

When it is determined that the fuel injection control and the ignition control (ignition) of the engine 10 have been started (step S440: NO), on the other hand, the engine controller 81 increments the target torque Te* of the engine 10 by a predetermined value Tex (shown in FIG. 4) (step S500) as shown in FIG. 7. The engine controller 81 subsequently determines whether a predetermined time period tc has elapsed since a start of the processing of step S500 (step S510) and repeats the process of incrementing the target torque Te* by the predetermined value Tex every time the target torque Te* is to be set, until elapse of the time period tc. The time period tc used as a reference value at step S510 is determined in advance by experiments and analyses.

When it is determined that the time period tc has elapsed (step S510: YES), the engine controller 81 calculates the difference $d\Delta N$ ($=\Delta N-\Delta N_{tag}$) between the rotation speed difference $\Delta N$ of the rotation speeds of the engine 10 and of the motor generator MG and the target rotation speed difference $\Delta N_{tag}$ (step S520) in the same manner as the processing of steps S300 to S340 in the routine of FIG. 5. The engine controller 81 subsequently determines whether the difference $d\Delta N$ calculated at step S520 is out of an allowable range (step S530). A reference value that is compared with the difference $d\Delta N$ (absolute value) at step S530 may be a fixed value or may be different values determined for the respective phases of the slip control, like step S350 described above.

When it is determined at step S530 that the difference $d\Delta N$ is within the allowable range, it is regarded that the output torque of the engine 10 is increased with an increase in the target torque Te* and that such an increase increases the actual rotation speed of the engine 10 such that the rotation speed difference $\Delta N$ becomes approximately equal to the target rotation speed difference $\Delta N_{tag}$. Accordingly, when it is determined that the difference $d\Delta N$ is within the allowable range (step S530: NO), the engine controller 81 sets a flag indicating that the target torque Te* is to be continually incremented by the value Tex (step S535) and then terminates the routine of FIG. 6. When it is determined at step S530 that the difference $d\Delta N$ is out of the allowable range, on the other hand, it is regarded that the rotation speed difference $\Delta N$ fails to follow the target rotation speed difference $\Delta N_{tag}$ even when both the engagement oil pressure command value $P_{K0}$* (the clutch torque of the clutch K0) and the target torque Te* (the output torque of the engine 10) are increased. Accordingly, when it is determined that the difference $d\Delta N$ is out of the allowable range (step S530: YES), the engine controller 81 stops the starting process of the engine 10 including the slip control of the clutch K0 and the like (step S540) and then terminates the routine of FIG. 6.

When the starting process of the engine 10 is stopped at step S490 or at step S540, the hybrid vehicle 1 of the embodiment performs again the starting process of the engine 10 including the slip control of the clutch K0 and the like. In the case where the engine 10 cannot be started by performing the starting process multiple times, an alarm lamp provided in an instrument panel (not shown) or the like is lit up.

As described above, the hybrid vehicle 1 performs the backup requirement/non-requirement determination routine of FIG. 5 and the backup control routine of FIGS. 6 and 7. The hybrid vehicle 1 sets the target rotation speed difference $\Delta N_{tag}$ that is the target value of the rotation speed difference $\Delta N$ between the rotation speeds of the engine 10 and the motor generator MG (step S320 in FIG. 5), while the slip control of the clutch K0 is performed in response to satisfaction of the start condition of the engine 10. When the difference $d\Delta N$ between the rotation speed difference $\Delta N$ and the target rotation speed difference $\Delta N_{tag}$ is out of the allowable range, the hybrid vehicle 1 increments at least one of the engagement oil pressure command value $P_K O$* of the clutch K0, the torque command value Tm* of the motor generator MG and the target torque Te* of the engine 10 (as shown in FIGS. 6 and 7). When the rotation speed difference $\Delta N$ between the rotation speeds of the engine 10 and the motor generator MG fails to follow the target rotation speed difference $\Delta N_{tag}$, this configuration compensates for an insufficiency of the torque transmitted from the clutch K0-side to the crankshaft 11 of the engine 10 or an insufficiency of the rotation of the engine 10.

More specifically, even in the case where the engagement oil pressure corresponding to the engagement oil pressure command value $P_{K0}$* is not suppliable to the clutch K0, for example, in a cryogenic environment, the hybrid vehicle 1 increases at least either one of the clutch torque of the clutch K0 and the output torque of the motor generator MG according to the difference $d\Delta N$ between the rotation speed difference $\Delta N$ and the target rotation speed difference $\Delta N_{tag}$, so as to increase the torque transmitted from the clutch K0-side to the crankshaft 11 and thereby increase the actual rotation speed of the engine 10 (as shown by a two-dot chain line curve in FIG. 4). Furthermore, after a start of the fuel injection control and the ignition control of the engine 10, the hybrid vehicle 1 increases the target torque Te* of the engine 10, i.e., the output torque of the engine 10 according to the difference dΔN between the rotation speed difference ΔN and the target rotation speed difference $ΔN_{tag}$, so as to increase the actual rotation speed of the engine 10 even in the state of a large friction of the engine 10 (as shown by a two-dot chain line curve in FIG. 4). The hybrid vehicle 1 appropriately calculates the target rotation speed difference $ΔN_{tag}$, based on the engagement oil pressure command value $P_{K0}^*$ of the clutch K0, the torque command value Tm* of the motor generator MG and the estimated output torque $Te_{est}$ of the engine 10 (steps S310 and S320 in FIG. 5). As a result, the hybrid vehicle 1 ensures the good startability of the engine 10.

When the difference dΔN between the rotation speed difference ΔN and the target rotation speed difference $ΔN_{tag}$ is out of the allowable range and the rotation speed Ne of the engine 10 is lower than the first reference value N1 (step S360: NO in FIG. 5), the hybrid vehicle 1 immediately increases the engagement oil pressure command value $P_{K0}^*$, in order to increase the engagement oil pressure that is to be supplied to the clutch K0 (steps S400 and S410 in FIG. 6). In the case where the actual rotation speed of the engine 10 fails to increase successfully immediately after a start of the slip control, i.e., during the cranking phase control, this configuration increases the torque (clutch torque) that is transmitted from the clutch K0 to the engine 10 and thereby increases the actual rotation speed of the engine 10.

Moreover, when the rotation speed Ne of the engine 10 is equal to or higher than the first reference value N1 and the predetermined time period (the time period determined from the reference value Cref and the execution period of the routine of FIG. 5) has elapsed with the difference dΔN between the rotation speed difference ΔN and the target rotation speed difference $ΔN_{tag}$ kept out of the allowable range (step S380: NO in FIG. 5), the hybrid vehicle 1 increases the engagement oil pressure command value $P_{K0}^*$, in order to increase the oil pressure that is to be supplied to the clutch K0 (steps S400 and S410 in FIG. 6). In the case where the actual rotation speed of the engine 10 fails to increase appropriately in the first standby phase or the later phase of the slip control, this configuration increases the torque (clutch torque) transmitted from the clutch K0 to the engine 10 and thereby increases the actual rotation speed of the engine 10.

When the fuel injection control and the ignition control (ignition) of the engine 10 have not yet been started and the rotation speed difference ΔN has only a small change (step S430: YES and step S440: YES in FIG. 6) after an increase in the engagement oil pressure command value $P_{K0}^*$ of the clutch K0 (steps S400 and S410 in FIG. 6), the hybrid vehicle 1 increases the torque command value T*, in order to increase the output torque of the motor generator MG (steps S450 and S460 in FIG. 6). In the case where the actual rotation speed of the engine 10 fails to increase successfully irrespective of an increase in the engagement oil pressure that is supplied to the clutch K0 during the slip control, this configuration increases the torque transmitted from the motor generator MG to the clutch K0 and thereby increases the actual rotation speed of the engine 10.

Furthermore, when the fuel injection control and the ignition control (ignition) of the engine 10 have been started and the rotation speed difference ΔN has only a small change (step S440: NO in FIG. 6) after an increase in the engagement oil pressure command value $P_{K0}^*$ of the clutch K0 (steps S400 and S410 in FIG. 6), the hybrid vehicle 1 increases the target torque Te*, in order to increase the output torque of the engine 10 (steps S500 and S510 in FIG. 7). In the case where the actual rotation speed of the engine 10 fails to increase irrespective of an increase in the engagement oil pressure supplied to the clutch K0 during the slip control, this configuration increases the actual rotation speed of the engine 10, while reducing a delay of rotation synchronization of the engine 10 with the motor generator MG.

At step S400 shown in FIG. 6, the processing may be performed to gradually increase the engagement oil pressure command value $P_{K0}^*$ of the clutch K0 with elapse of time. At step S450 shown in FIG. 6 or at step S500 shown in FIG. 7, the torque command Tm* of the motor generator MG or the target torque Te* of the engine 10 may be increased gradually with elapse of time. Additionally, at steps S420, S430, S470 and S480 shown in FIG. 6 and at steps S520 and S530 shown in FIG. 7, it is not essential to use the target rotation speed difference $ΔN_{tag}$ that is set based on the estimated rotation speed $Ne_{est}$ of the engine 10. More specifically, at steps S420, S430, S470 and S480 shown in FIG. 6 and at steps S520 and S530 shown in FIG. 7, it may be determined whether the rotation speed difference ΔN of the rotation speeds of the engine 10 and the motor generator MG has a small change or not (i.e., an insufficient change or not), based on the rotation speed difference ΔN obtained from the rotation speed Ne that is calculated on the basis of the crank angle or based on an amount of change of the rotation speed difference ΔN.

The engine 10 of the hybrid vehicle 1 described above may be a diesel engine or an LPG engine. The hybrid vehicle 1 may be a front-wheel-drive vehicle or a rear-wheel-drive vehicle without the transfer 40 and the like. The clutch K0 may be a single disk hydraulic friction clutch. Furthermore, a clutch may be placed between the rotor of the motor generator MG and the transmission shaft 17 to couple and separate the rotor with and from the transmission shaft 17. The transmission 25 of the power transmission device 20 may be a continuously variable transmission or a dual clutch transmission. Moreover, according to the embodiment, the engine controller 81, the clutch controller 82 and the change speed controller 83 are established in an identical ECU. This configuration is, however, not essential. According to a modification, the engine controller 81, the clutch controller 82 and the change speed controller 83 (or respective functions thereof) may be established in a plurality of different ECUs in a distributed manner.

As described above, a hybrid vehicle according to this aspect of the present disclosure including an engine, a motor configured to output a torque to a driving system, a hydraulic clutch configured to connect the engine with the motor and to disconnect the engine from the motor, and a control device configured to perform slip control of the hydraulic clutch in response to satisfaction of a start condition of the engine and to control the motor such as to output at least a cranking torque to the engine. The control device sets a target value of a rotation speed difference between rotation speeds of the engine and of the motor during execution of the slip control, and increases at least one of a hydraulic pressure that is to be supplied to the hydraulic clutch, an output torque of the motor and an output torque of the engine when a difference between the rotation speed difference and the target value is out of an allowable range.

In the hybrid vehicle of this aspect, the control device performs the slip control of the hydraulic clutch in response to satisfaction of the start condition of the engine, and sets the target value of the rotation speed difference between the rotation speeds of the engine and of the motor during execution of the slip control. When the difference between the rotation speed difference and the target value is out of the allowable range, the control device increases at least one of the hydraulic pressure that is to be supplied to the hydraulic clutch, the output torque of the motor and the output torque of the engine. In the case where the rotation speed difference between the rotation speeds of the engine and the motor fails to follow the target value, this configuration compensates for an insufficiency of a torque that is transmitted from the hydraulic clutch-side to the engine or an insufficiency of rotation of the engine. As a result, the hybrid vehicle of this aspect ensures good startability of the engine.

In the hybrid vehicle of the above aspect, when the difference between the rotation speed difference and the target value is out of the allowable range and the rotation speed of the engine is lower than a predetermined rotation speed, the control device may increase the hydraulic pressure that is to be supplied to the hydraulic clutch. In the case where the rotation speed of the engine fails to increase immediately after a start of the slip control (cranking), this configuration increases a torque (clutch torque) that is transmitted from the hydraulic clutch to the engine and thereby increases the rotation speed of the engine.

In the hybrid vehicle of the above aspect, when the rotation speed of the engine is equal to or higher than the predetermined rotation speed and a predetermined time period has elapsed with the difference between the rotation speed difference and the target value kept out of the allowable range, the control device may increase the hydraulic pressure that is to be supplied to the hydraulic clutch. In the case where the rotation speed of the engine fails to increase appropriately after the rotation speed of the engine becomes equal to or higher than the predetermined rotation speed, this configuration increases the torque (clutch torque) that is transmitted from the hydraulic clutch to the engine and thereby increases the rotation speed of the engine.

In the hybrid vehicle of the above aspect, when fuel injection and ignition of the engine have not yet been started and the rotation speed difference has a small change after an increase in the hydraulic pressure that is to be supplied to the hydraulic clutch, the control device may increase the output torque of the motor. In the case where the rotation speed of the engine fails to increase successfully irrespective of an increase in the hydraulic pressure that is to be supplied to the hydraulic clutch during the slip control, this configuration increases the torque that is transmitted from the motor to the hydraulic clutch and thereby increases the rotation speed of the engine.

In the hybrid vehicle of the above aspect, when fuel injection and ignition of the engine have been started and the rotation speed difference has a small change after an increase in the hydraulic pressure that is to be supplied to the hydraulic clutch, the control device may increase the output torque of the engine. In the case where the rotation speed of the engine fails to increase successfully irrespective of an increase in the hydraulic pressure that is to be supplied to the hydraulic clutch after a start of the slip control, this configuration increases the rotation speed of the engine, while reducing a delay of rotation synchronization of the engine with the motor.

In the hybrid vehicle of the above aspect, the control device may calculate the target value, based on at least a hydraulic pressure command value of the hydraulic clutch, a torque command value of the motor and an estimated output torque of the engine. This configuration appropriately sets the target value of the rotation speed difference between the rotation speeds of the engine and of the motor.

In the hybrid vehicle of the above aspect, the driving system may include a fluid transmission device, a lockup clutch, and a transmission that is connected with the motor via at least one of the fluid transmission device and the lockup clutch.

In the control method of a hybrid vehicle of the above aspect, the hybrid vehicle includes an engine, a motor configured to output a torque to a driving system, and a hydraulic clutch configured to connect the engine with the motor and to disconnect the engine from the motor. The control method of the hybrid vehicle includes performing slip control of the hydraulic clutch in response to satisfaction of a start condition of the engine, while controlling the motor such as to output at least a cranking torque to the engine, and setting a target value of a rotation speed difference between rotation speeds of the engine and of the motor during execution of the slip control, and increasing at least one of a hydraulic pressure that is to be supplied to the hydraulic clutch, an output torque of the motor and an output torque of the engine when a difference between the rotation speed difference and the target value is out of an allowable range.

In the case where the rotation speed difference between the rotation speeds of the engine and the motor fails to follow the target value, this control method compensates for an insufficiency of a torque that is transmitted from the hydraulic clutch-side to the engine or an insufficiency of rotation of the engine and accordingly ensures good startability of the engine.

The aspects of the present disclosure are not limited at all to the embodiments described above but may be modified, changed and altered in various ways within the extended scope of the present disclosure. The embodiments of the present disclosure are provided to illustrate the concrete examples of the aspects of the present disclosure described in Summary and are not intended to limit the features of the present disclosure described in Summary.

INDUSTRIAL APPLICABILITY

The disclosure is applicable to, for example, the manufacturing industries of hybrid vehicles.

The invention claimed is:

1. A hybrid vehicle comprising:
an engine;
a motor configured to output a torque to a driving system;
a hydraulic clutch configured to connect the engine with the motor and to disconnect the engine from the motor; and
a control device configured to
perform slip control of the hydraulic clutch in response to satisfaction of a start condition of the engine and to control the motor such as to output at least a cranking torque to the engine,
calculate a target value of a rotation speed difference between rotation speeds of the engine and of the motor during execution of the slip control based on at least a hydraulic pressure command value of the hydraulic clutch, a torque command value of the motor, and an estimated output torque of the engine, and
increase at least one of a hydraulic pressure that is to be supplied to the hydraulic clutch, an output torque of the motor and an output torque of the engine when a difference between the rotation speed difference and the target value is out of an allowable range.

2. The hybrid vehicle according to claim 1,
wherein the control device is configured to increase the hydraulic pressure that is to be supplied to the hydraulic clutch when the difference between the rotation speed difference and the target value is out of the allowable range and the rotation speed of the engine is lower than a predetermined rotation speed.

3. The hybrid vehicle according to claim 2,
wherein the control device is configured to increase the hydraulic pressure that is to be supplied to the hydraulic clutch when the rotation speed of the engine is equal to or higher than the predetermined rotation speed and a predetermined time period has elapsed with the difference between the rotation speed difference and the target value kept out of the allowable range.

4. The hybrid vehicle according to claim 2,
wherein the control device is configured to increase the output torque of the motor when fuel injection and ignition of the engine have not yet been started and the difference between the rotation speed difference and the target value is out of the allowable range after an increase in the hydraulic pressure that is to be supplied to the hydraulic clutch.

5. The hybrid vehicle according to claim 2,
wherein the control device is configured to increase the output torque of the engine when fuel injection and ignition of the engine have been started and the difference between the rotation speed difference and the target value is out of the allowable range after an increase in the hydraulic pressure that is to be supplied to the hydraulic clutch.

6. The hybrid vehicle according to claim 1,
wherein the driving system includes a fluid transmission device, a lockup clutch, and a transmission that is connected with the motor via at least one of the fluid transmission device and the lockup clutch.

7. A control method of a hybrid vehicle that includes an engine, a motor configured to output a torque to a driving system, and a hydraulic clutch configured to connect the engine with the motor and to disconnect the engine from the motor, the control method of the hybrid vehicle comprising:
performing slip control of the hydraulic clutch in response to satisfaction of a start condition of the engine, while controlling the motor such as to output at least a cranking torque to the engine; and
calculating a target value of a rotation speed difference between rotation speeds of the engine and of the motor during execution of the slip control based on at least a hydraulic pressure command value of the hydraulic clutch, a torque command value of the motor, and an estimated output torque of the engine, and increasing at least one of a hydraulic pressure that is to be supplied to the hydraulic clutch, an output torque of the motor, and an output torque of the engine when a difference between the rotation speed difference and the target value is out of an allowable range.

* * * * *